United States Patent [19]

Van Ooijen

[11] Patent Number: 5,562,916
[45] Date of Patent: Oct. 8, 1996

[54] CONTROL OF AMMONIA EMISSION AND ODOR

[75] Inventor: Johannes A. C. Van Ooijen, Giessenburg, Netherlands

[73] Assignee: Verdugt B.V., Netherlands

[21] Appl. No.: 444,837

[22] Filed: May 18, 1995

[30] Foreign Application Priority Data

May 27, 1994 [GB] United Kingdom ............ 9410705
Jun. 18, 1994 [GB] United Kingdom ............ 9412295

[51] Int. Cl.$^6$ ............ A23K 1/165; A23K 1/17; A23K 1/18
[52] U.S. Cl. ............ 424/442; 426/807
[58] Field of Search ............ 424/442; 426/807

[56] References Cited

U.S. PATENT DOCUMENTS 3,989,498  11/1976  Walker ............ 504/102
4,405,354  9/1983  Thomas et al. ............ 71/21

FOREIGN PATENT DOCUMENTS 58-187149  11/1983  Japan.
60-015331  4/1985  Japan.
62096046  5/1985  Japan.
3-034905  2/1991  Japan.
1703028  1/1992  Switzerland.

OTHER PUBLICATIONS

Proceedings 1993 Cornell Nutrition Conference for Feed Manufacturers, 1993, 55th Ithaca, N.Y. pp. 130–143.
Keshavaraz K.; et al 'The Effect of Acidogenic Salts on Acid–Base Balance and Eggshell Quality in Laying Hens'. Keshavarz, Poultry Science, vol. 70 (1991) pp. 1723–1731.
Keshavarz, Proc. 1993, Cornell Nutrition Conf., pp. 19–32.

*Primary Examiner*—Carlos Azpuru
*Attorney, Agent, or Firm*—Brooks Haidt Haffner & Delahunty

[57] ABSTRACT

This invention relates to an animal feed composition which comprises an effective amount of an acidogenic compound selected from the group consisting of lysine, benzoic acid or a salt thereof, an alkaline earth metal salt of a mineral acid and an ammonium salt of a carboxylic acid which is capable of maintaining the pH value of the excrement of the animal so fed at or below 7 for at least 24 hours. The compound is suitably a calcium salt of sulphuric, hydrochloric or phosphoric acid or ammonium benzoate. The compound suppresses or inhibits ammonia emission in animal excreta.

11 Claims, No Drawings

CONTROL OF AMMONIA EMISSION AND ODOR

This invention relates to method of controlling and/or preventing emisison of odoriferous ammonia from organic wastes, especially animal excrements and manure, using a specific animal feed composition.

Ammonia is the by-product from the degradation of urea by enzymes such as urease, which urea is in turn formed by the degradation of uric acid. In poultry houses and in pig farms in general, the concentration of ammonia in the atmosphere can be sufficiently high for it not only to be a nuisance but also can be the cause of ammonia blindness in poultry. This in turn can put poultry or other animals off their feed and hence cause loss of production. In the case of pigs and piglets, presence of excess ammonia in the atmosphere where these are housed can cause respiratory illnesses. The same applies to other animals, be they cattle in a farm or domestic pets such as cats, dogs, birds, hamsters or guinea pigs. In all these cases there is a likelihood of excreta accumulating which is the prime cause of ammonia build up. The presence of excess ammonia in the atmosphere can also be harmful to farmworkers who have of necessity to handle such materials in order to produce good quality manure which in itself can give off ammonia due to degradation. In addition to the above, ammonia is one of the sources of acid rain.

Many methods have been tried to eliminate/control ammonia emission or to mask such odour but with limited success because the agents used for such purpose are either themselves odoriferous or are unpleasant to the handlers of such agents. Use of masking agents such as perfumes etc have also been unsuccessful and expensive. For instance, U.S. Pat. No. 3,944,908 describes the use of a biological fertilizer produced by treating sewage sedimentation sludge with sulphite waste liquor and the treated product is mixed with pulverised vegetable matter. Mineral acids such as sulphuric acid and hydrochloric acid have been used to control odours. U.S. Pat. No. 3,989,498 describes the use of a mixture of glacial acetic acid and amyl alcohol for this purpose, the latter having a deodorising effect. U.S. Pat. No. 5,039,481 describes a method of scavenging ammonia released into the air by decomposition of livestock excrement using a scavenging composition comprising a polycarboxylic acid such as oxalic acid; 1,2-, 1,3- or 1,4-cyclohexane dicarboxylic acid; or polyacrylic acid. These acids optionally contain solubilizing agents, eg water or a glycol, fragrances and an adsorbent which may be sawdust or rice hulls. The abstract of JP-A-85015331 is similar to the last document except that the composition comprises a mixture of oxalic, adipic or tartaric acid with a compost obtained from aerobic fermentation of sewages, faeces etc. U.S. Pat. No. 4,405,354 also describes a method of supressing and limiting the ammoniacal odour of organic wastes by contacting the waste with an anti-ammoniacal agent which comprises a control component selected from (a) monobasic salts of dibasic acids, or, mono-, di- or tri-basic acids etc, the control component having a dissociation constant (pKa) less than that of aqueous ammonia. One of the other attendant problems of the waste materials capable of generating ammonia is that these are usually exposed to the elements and for example, during rainfall, the agent used for absorbing ammonia is likely to be leached away thereby rendering the protection method substantially inadequate. This is particularly likely if the acidic agents used are eg sulphuric acid, hydrochloric acid, or fatty acids such as formic, acetic and propionic acid which are all completely miscible with water.

More recently, JP-A-91034905 and JP-A-62096046 describe the use of iron salts of organic acids in animal feeds to reduce or inhibit ammonia emission in excreta. One of the problems with such salts is that in order to be effective, the concentration of iron required in the feedstuffs will have to be so high as to be seriously toxic to the animal itself.

Thus, most of the expedients described above are have been concerned with treating the excrement after it has been excreted by the animal and hence after the emission of ammonia has commenced to a certain extent. Moreover, such expedients for inhibiting ammonia emission are either expensive or ineffective due to inadequate coverage of the required surface or due to their susceptibility to be leached by water or rain; in addition, some of the acids such as formic, acetic or propionic acid are themselves significantly odorous and corrosive and are hence difficult to handle in the relevant environment and may themselves be a pollutant. Moreover, use of organic acids such as ascorbic acid are likely to be uneconomic for this purpose.

It is also known in the art to feed animals with a diet comprising a chloride, phosphate or sulphate of a cation such as calcium in order to make up the calcium lost from the animals due to excretion in the presence of acidogenic anions (See article entitled "The Effect of Calcium Sulfate (Gypsum) in Combination with Different Sources and Forms of Calcium Carbonate on Acid-Base Balance and Eggshell Quality" by K Keshavarz in Poultry Science, 70, pp 1723–1731 (1991). These studies on the effect of calcium sulphate were primarily attempted in order to ascertain their effect on the egg-shell quality and blood acid-base balance status of laying hens. In this article, the author concludes:

"The present experiments indicate that calcium sulfate per se is not a satisfactory source of calcium for laying hens." (page 1731, left-hand column, lines 8–10).

The author further adds in the last paragraph on the same page that:

"The lack of response from calcium chip supplementation is probably caused by its lower solubility and lower proportion of large particles than oyster shell."

In the second paragraph of a later article (See article entitled "The Effect of Acidogenic Salts on Acid-Base Balance and Eggshell Quality in Laying Hens" by K Keshavarz, in "Proceedings 1993" of the Cornell Nutrition Conference for Feed Manufacturers (1993), pp 19–21), the same author states that:

"The results of the previous experiments in our laboratory indicated that high dietary levels of chloride, phosphorus or sulfate have detrimental effects on shell quality, and alter blood indicators of acid-baize balance (11–13). Furthermore, the information obtained indicated that the adverse effect of acidogenic anions on shell quality was accompanied by increased calcium excretion."

Moreover, in the last paragraph of this later article, the author—confirming his earlier views—concludes:

"The results of these series of experiments generally indicated that; a) shell quality is reduced and blood indicators of acid-base balance are altered due to inclusion of calcium salts of chloride, phosphorus and sulfate to the diet . . . . "

However, it is clear from these articles that calcium chloride, phosphate or sulphate were not desirable components of a diet, at least for a laying hen and nor were they used for the purpose of preventing or inhibiting ammonia emission from animal excreta.

It has now been found that the above problems can be mitigated by altering the nature of the feed to the animal such as poultry, cattle and pigs such that the excrement of the animal fed on such a diet has a pH value of 7 or below 7 thereby suppressing ammonia emission "at source".

Accordingly, the present invention is a method of controlling or preventing ammonia emission from animal excrements, said process comprising feeding the animal a feedstuff which comprises an effective amount of at least one acidogenic compound selected from the group consisting of lysine, benzoic acid or a salt thereof, an alkaline earth metal salt of a mineral acid and an ammonium salt of a carboxylic acid such that the excrement of said animal has a pH value of 7 or below 7 at the time of excretion.

Thus according to a further embodiment, the present invention is an animal feed composition which comprises an effective amount of an acidogenic compound described above which is capable of maintaining the pH value of the excrement of the animal so fed at or below 7 for at least 24 hours.

Where the acidogenic compound is an alkaline earth metal salt, it is suitably a chloride, a phosphate or sulphate. The salts of calcium are preferred, especially calcium sulphate. The acidogenic compound can also be an ammonium salt of an organic acid such as ammonium benzoate. Salts of sodium, potassium and iron are excluded since it is the objective of the present invention to minimise the sodium, potassium and iron content of such diets This can be achieved by relatively increasing the acidic anion content of such diets. Where a salt of benzoic acid is used as the acidogenic compound, it is preferable to use it in combination with an electrolyte. Examples of electrolytes include the salts of mineral acids especially sulphuric, hydrochloric or phosphoric acid. Alkaline earth or ammonium salts of these mineral acids are the preferred electrolytes, especially ammonium chloride.

Thus, yet another embodiment of the present invention is an animal feed composition comprising an effective amount of a salt of benzoic acid and an electrolyte which is capable of maintaining the pH of the excrement of the animals so fed at or below 7 for at least 24 hours.

In such a formulation, the ratio of the electrolyte to the benzoic acid salt is suitably in the range from 0.5:1 to 5:1 w/w, preferably from 1.5:1 to 3:1 w/w.

The composition of a conventional basal diet for an animal such as poultry, pigs or cattle suitably comprises the components shown in Table 2 below:

It can be seen that these conventional diets include around 7–8% by weight of calcium carbonate. If 10–50% w/w, preferably from 15–45% w/w, of this calcium carbonate component is replaced eg with an acidogenic calcium salt such as the chloride, phosphate or sulphate of calcium, it has now been found that the excreta of the animal fed on such a diet will have a pH value in the range from 6.3–6.9. Since this is an acidic pH value, no ammonia is emitted from the excreta. Moreover, since the pH value is 7 throughout the excreta, there is no risk of the inhibitive effect of suppressing ammonia emission being diminished by external factors such as rain or breeze. There is no need to continually add chemicals from an external source to maintain this pH value and there is no pollution of the environment nor is there any need for an operative to handle or apply the inhibitor to the excreta. All that is required is to meter out the required amount of the acidogenic calcium salt during the preparation of the diet for the animal. In all cases, the pH value of the excrement is maintained below 7 for a period of at least 24 hours after excretion and in most cases the pH value is maintained below 7 for at least 48 hours. In the case of using a combination of an electrolyte and a benzoic acid salt such as eg ammonium chloride and ammonium benzoate, the pH of the excrement is maintained below 7 after one week and at or about 7 after 10 days.

In spite of the adverse teachings of the prior art reviewed above, the present invention shows that by using a judicious amount of an acidogenic compound to the diet of an animal, whether they be laying hens, cattle or pigs, the adverse effects can be minimised and, in fact, the beneficial effect of reducing ammonia emission from their excreta can be realised.

The present invention is further illustrated with reference to the following Example:

EXAMPLE 1

A feed composition was prepared which had the following ingredients in percentage by weight shown in Table 1 below:

TABLE 1

| Ingredients | Calculated Analysis (%) |
| --- | --- |
| Corn | 63.90 |
| Soyabean meal | 20.26 |
| Meat and bone meal | 6.00 |
| Blended fat | 2.00 |
| Salt | 0.35 |
| Vitamin mix | 0.25 |
| Mineral mix | 0.15 |
| DL-Methionine | 0.09 |
| Limestone | 4.00 |
| Calcium sulphate | 4.00 |

This feed composition was fed to poultry and the pH value of the excreta from the poultry thus fed was measured and found to be 6.7. Clearly this is an acidic pH and hence there is unlikely to be any emission of ammonia from such excreta.

COMPARATIVE TEST 1: (not according to the invention):

In a comparative test, the following conventional feed composition shown in Table 2 was fed to poultry.

TABLE 2

| Ingredients | Calculated Analysis (%) |
| --- | --- |
| Corn | 63.90 |
| Soyabean meal | 20.26 |
| Meat and bone meal | 6.00 |
| Blended fat | 2.00 |
| Salt | 0.35 |
| Vitamin mix | 0.25 |
| Mineral mix | 0.15 |
| DL-Methionine | 0.09 |
| Limestone | 8.00 |

The pH value of the excreta from poultry fed by this feed composition was measured to be 7.6. This is an alkaline pH and it is clear that under such conditions the excreta would cause undesirable emission of ammonia.

It was also surprisingly found that when ammonium benzoate is used as a component in pig feed along with ammonium chloride, the pH of the excreta of pigs fed on such a feed was only 4.6. The pH of excreta on pigs fed on a conventional feed normally increases with passage of time eg after 8 hours. However, when the composition now claimed is incorporated in pig feed, the pH of the excreta remained below 7 after a week and low (at or about 7) even after ten days as can be seen from the Example below:

EXAMPLE 2

The following feed compositions (shown in Table 3 below) in which all the amounts shown in % by weight were fed to pigs.

TABLE 3

| Composition | Control I | Control II | Example 2 |
|---|---|---|---|
| Meat meal (58% Crude protein) | 3.20 | 3.20 | 3.20 |
| Molasses | 5.00 | 5.00 | 5.00 |
| Wheat | 5.90 | 5.90 | 5.90 |
| Soybean meal (45% Crude protein) | 15.1 | 15.1 | 15.1 |
| Tapioca (66% starch) | 38.5 | 36.5 | 35.5 |
| Wheat middlings | 15 | 15 | 15 |
| Animal fat | 3.3 | 3.3 | 3.3 |
| Limestone | 0.74 | 0.74 | 0.74 |
| Lysine hydrochloride (98%) | 0.06 | 0.06 | 0.06 |
| Vitamin premix | 0.5 | 0.5 | 0.5 |
| Trace minerals | 0.5 | 0.5 | 0.5 |
| Sunflower meal | 12.2 | 12.2 | 12.2 |
| Ammonium chloride | — | 2 | 2 |
| Ammonium benzoate | — | — | 1 |

The pH of the urine of the pigs fed on these diets for two days was monitored over various durations and found to be as follows (see Table 4 below):

TABLE 4

| Duration | Control I - pH | Control II - pH | Example 2 - pH |
|---|---|---|---|
| After 0 Days* | 8.15 | 5.22 | 4.68 |
| After 7 days | 8.30 | 8.57 | 5.01 |
| After 10 days | 8.30 | 8.60 | 6.92 |

*First excretion by the pigs after the two day feeding stage.

From these results it is abundantly clear that the use of the additives of the present invention gives rise to excrements of highly acidic and stable pH values and consequently gives rise to little or no ammonia emissions.

I claim:

1. An animal feed composition which comprises an effective amount of at least one acidogenic compound selected from the group consisting of lysine, benzoic acid or a salt thereof, an alkaline earth metal salt of a mineral acid and an ammonium salt of a carboxylic acid which is capable of maintaining the pH value of the excrement of the animal so fed at or below 7 for at least 24 hours.

2. A composition according to claim 1 wherein the acidogenic compound is a chloride, a phosphate, sulphate or a benzoate.

3. A composition according to claim 1 wherein the acidogenic compound is an ammonium or a calcium salt.

4. A composition according to claim 1 wherein the acidogenic compound is calcium sulphate or ammonium benzoate.

5. A composition according to claim 4 wherein the ammonium benzoate is used in combination with an electrolyte.

6. A composition according to claim 5 wherein the electrolyte is a mineral acid selected from one or more of sulphuric acid, hydrochloric acid and phosphoric acid, and/or an ammonium salt thereof.

7. A composition according to claim 5 wherein the ratio of the electrolyte to the benzoate salt is in the range from 0.5:1 to 5:1 w/w.

8. A composition according to claim 5 comprising an effective amount of a benzoate salt and an electrolyte which is capable of maintaining the pH of the excrement of the animals so fed at or below 7 for at least 24 hours.

9. A composition according to claim 5 wherein, the ratio of the electrolyte to the benzoate salt is in the range from 0.5:1 to 3:1 w/w.

10. A composition according to claim 1 wherein 10–50% w/w of limestone in a basal animal diet shown in the Table below is replaced by an acidogenic calcium chloride, phosphate, or sulphate such that the excreta of the animal fed on such a diet will have a pH value in the range from 6.3–6.9:

| Ingredients | Calculated Analysis (%) |
|---|---|
| Corn | 63.90 |
| Soyabean meal | 20.26 |
| Meat and bone meal | 6.00 |
| Blended fat | 2.00 |
| Salt | 0.35 |
| Vitamin mix | 0.25 |
| Mineral mix | 0.15 |
| DL-Methionine | 0.09 |
| Limestone | 8.00 |

11. A method of controlling or preventing ammonia emission from animal excrements, said process comprising feeding the animal a feedstuff which comprises an effective amount of at least one acidogenic compound selected from the group consisting of lysine, benzoic acid or a salt thereof, an alkaline earth metal salt of a mineral acid and an ammonium salt of a carboxylic acid such that the excrement of said animal has a pH value of 7 or below 7 at the time of excretion.

* * * * *